United States Patent [19]

Kim

[11] Patent Number: 4,981,706
[45] Date of Patent: Jan. 1, 1991

[54] METHOD FOR MANUFACTURING A FOOD COMPOSITION, THE FOOD AND DISHES CONTAINING THIS FOOD COMPOSITION

[75] Inventor: Jong C. Kim, Wageningen, Netherlands

[73] Assignee: Nederlandse Organisatie voor toegepast natuurwetenschappelijk onderzoak, Netherlands

[21] Appl. No.: 464,729

[22] Filed: Jan. 16, 1990

Related U.S. Application Data

[63] Continuation of Ser. No. 207,887, Jun. 13, 1988, abandoned, which is a continuation of Ser. No. 932,615, Nov. 20, 1986, abandoned.

[30] Foreign Application Priority Data

Nov. 26, 1985 [NL] Netherlands ..................... 8503271

[51] Int. Cl.$^5$ .............................................. A21D 2/26
[52] U.S. Cl. ...................................... 426/93; 426/656; 426/657; 426/622; 426/661; 426/96
[58] Field of Search .................... 426/93, 656–657, 426/96, 661, 622, 449, 448

[56] References Cited

U.S. PATENT DOCUMENTS

| | | | |
|---|---|---|---|
| 3,579,352 | 5/1971 | Bookwalter et al. | 426/448 |
| 3,869,558 | 3/1975 | Hampton et al. | 426/622 X |
| 4,032,668 | 6/1977 | Jones et al. | 426/449 |
| 4,049,840 | 9/1977 | Reesman et al. | 426/448 X |
| 4,438,146 | 3/1984 | Colby | 426/449 X |
| 4,650,685 | 3/1987 | Perrson et al. | 426/622 X |

FOREIGN PATENT DOCUMENTS

| | | | |
|---|---|---|---|
| 683332 | 3/1964 | Canada | 426/448 |
| 0090775 | 10/1983 | European Pat. Off. | |
| 0105787 | 4/1984 | European Pat. Off. | 426/622 |
| 7704281 | 10/1977 | Netherlands . | |
| 1577870 | 6/1977 | United Kingdom . | |
| 2120518 | 12/1983 | United Kingdom . | |

OTHER PUBLICATIONS

Spadara et al, Extrusion of Rice with Cottonseed and Peanut Flours, Cereal Science Today, Aug. 1971, pp. 238–240, 261.

"Webster's New Collegiate Dictionary", G. & C. Merriam Co.: Springfield, Mass., 1979, p. 836.

Wolf, W. J. and Cowan, J. C., *Soybeans as a Food Source*, Rev. Ed., CRC Press, Cleveland, p. 5, p. 30 (1975).

*Wheat: Chemistry and Technology*, Pomeranz, Y., Ed., Amer. Assn. of Cereal Chemists, St. Paul, p. 568, p. 703 (1971).

"Industrial Processing of Cotton–Seed;" A Technical Study Prepared and Translated for the Unido Industrial and Technological Information Bank, S.E.D.I.A.C., Paris, p. 55, p. 59, (1978).

Kim, J. C., "Preparing Bread and Flour Confectionery . . .," *Process Report* 4, Food and Agr. Assn., Rome, p. 11 Table 5, (1968).

"Wheat Chemistry and Technology", I. Hlynka, American Association of Cereal Chemists, Incorporated, p. 504, 1964.

*Primary Examiner*—Joseph Golian
*Attorney, Agent, or Firm*—Webb, Burden, Ziesenheim & Webb

[57] ABSTRACT

The invention relates to a method for preparing a substantially granular food composition which contains digestible starch having a substantially granular structure, whereby said starch is provided with coagulable protein and said protein is subsequently coagulated, and the ratio of starch to protein lies between 97–60: 3–40, and to a granular food composition characterized by digestible starch that is provided with coagulated protein, and that the ratio of starch to protein lies between 97–60: 3–40. In both cases the ratio of starch to protein lies between 97–70: 3–30, preferably 90:10. The food product may have the form of filled cake, other bakery products and dish, couscous, anko, snack and the like provided with a granular food composition.

9 Claims, No Drawings

METHOD FOR MANUFACTURING A FOOD COMPOSITION, THE FOOD AND DISHES CONTAINING THIS FOOD COMPOSITION

This is a continuation of co-pending application Ser. No. 07/207,887 filed on June 13, 1988 now abandoned, which in turn is a continuation of copending application Ser. No. 06/932,615 filed on Nov. 20, 1986 and now abandoned.

The present invention relates to a method for preparing a substantially granular food composition which contains digestible starch having a substantially granular structure. The invention further relates to this food composition per se, as well as to food products in which the food composition is processed.

Food compositions containing starch have to undergo a heat treatment, in combination with moisture, if required, in order to make the starch digestible. Starch consists of starch grains. These starch grains consist of an outer layer and a kernel both having a starch composition chemically different from each other. By subjecting the starch grains to a heat treatment in the presence of moisture the outer layer of the starch is broken open and the starch grain becomes better digestible.

A consequence of breaking open the starch grain is that when it is absorbed into water the content of the starch grain is leached and a colloidal, usually viscous solution occurs. Furthermore the granular structure is lost and a pasty, formless mass results through the absorption of water.

In many food products it is desired that at least a part of the food compositions processed into them have a granular structure, this being linked with a determined taste sensation for that food product.

The Dutch patent application NL-A-77.04281 relates to a method for manufacturing a bakery product with a cellular structure, as occurs in bread, Dutch rusk, biscuit, toast and the like. This foodstuff or dietary substance consists for at least 60% of protein of animal or vegetable origin and always contains less than 10% starch. This foodstuff or dietary substance has a strongly divergent cellular structure, which is reflected in its composition, namely a large excess of protein relative to starch.

The European patent application EP-A-90775 relates to a crispy savoury that is manufactured by starting from a watery dispersion which is processed into a dough that is heated to 60°-110° C., so that gelatinization of the starch can occur. The crispy savoury comprises an excess of protein relative to starch.

GB-A-2.120.518 describes an extruded protein product prepared from a watery protein solution which contains coagulable protein. The texture of this meat analogue is fibrous.

The invention has for its object to provide a food composition which has a substantially granular structure, because the digestible starch present in it preserves its granular structure even after mixing with water or mixtures containing water.

This is achieved according to the invention because the starch is provided with coagulable protein and prior to further processing of the food composition the protein adhered to starch is coagulated and the ratio of starch to protein lies between 97-60:3-40.

By applying coagulable protein to digestible starch, the water absorbing capacity of the digestible starch grains can be controlled such that no pasty mass results and a granular structure is preserved. An additional advantage is that the increase in viscosity occurring under normal conditions is markedly lower.

If use is made of starch grits it is possible on the one hand to apply protein to be coagulated to starch grits and to then coagulate the protein and at the same time make the starch digestible in a single heat treatment, while on the other hand protein is applied to starch grits containing digestible starch, the protein then being coagulated in a separate heat treatment. In order to preserve the granular structure during forming of digestible starch grits, the starch grits have to be heated with a small measure of water, for example with steam.

On the other hand it is possible to start from starch flour that is mixed with protein to be coagulated. The protein can be coagulated and the starch made digestible simultaneously, for example by extrusion. It is also possible to form threads from the mixture of protein to be coagulated and starch flour and to then heat these threads. In both cases the granular structure is obtained by granulating either the extruded product or the formed heated threads to a required granule size distribution.

Depending on the type of starch and the natural seasonal variation in it and on the type of protein or the use of an additional protein source (leguminous plants, soya beans), the granular structure of the digestible starch is preserved if the ratio of starch to protein lies between 97–60:3–40, or preferably lies between 97–70:3–30, or more preferably 90:10. If more protein is used than according to the ratios indicated the product becomes technologically unmanageable and expensive.

The granular food composition according to the invention is characterized by digestible starch with a granular structure that is provided with coagulated protein. Starting out from starch grits a number of starch grain form a particle, while starting out from starch flour parts of starch grains form a particle.

Coagulable protein applicable in the invention is protein that has a coagulation point of about 100° C. at the most, this being especially the case for egg yolk proteins and soya bean proteins. Examples of proteins that can be used are egg proteins (from egg-white and egg yolk), whey proteins, serum albumin and vegetable proteins (soya beans, leguminous plants). For many applications use need only be made of a protein fraction of technical grade, for example having a protein content of only 30%.

The starch to be used can come from a number of different sources: cereals (wheat, rye, rice, maize, barley, sorghum, millet and teff), leguminous plants (haricot beans, kidney beans, marrow-fat peas, mango beans, cow beans and bean shoots (tauge) prepared from beans.

By starch grits is understood a product rich in starch of broken but not finely ground cereal, leguminous plants.

By starch flour is understood a flour rich in starch from finely sifted flour of cereal, leguminous plants. With respect to leguminous plants it is noted that these products can serve as a protein source as well as a starch source.

The food composition according to the present invention contains starch provided with coagulated protein, the starch preserving its granular structure in a water-rich environment.

Surprisingly, it has been found that the food composition according to the present invention is especially suitable for processing in cakes with fillings and other bakery products with a paste filling. In this case, namely, use is made for the preparation of the paste of one part food composition, one part water and saccharose. In spite of an environment very rich in water the food composition preserves its granular structure after the products have passed through the baking process.

Other applications of the food product are in couscous, anko and diverse snacks.

The manufacture of the food composition according to the invention and its application in diverse food products will be described with reference to a number of embodiments.

EXAMPLE 1

100 parts by weight wheat flour, (biscuit flour, Meneba, Rotterdam, the Netherlands) is mixed with 10 parts by weight whey protein (BV-19; DMV, Veghel, the Netherlands) containing circa 50% lacto-albumin and about 20 parts by weight water.

The mixture is extruded in an HTST-extruder (High Temperature Short Time extruder, a co-rotating twin screw extruder (type BC 45, Clextral, Firminy, France), with an extrusion temperature of circa 100° C. The extrusion temperature (preferably lying between 50°–150° C.) is selected in relation to the residence time in the extruder (for example 1 minute) such that a sufficient decapsulation, that is, making digestible, of the starch results. The extruded product obtained has a moisture content of circa 20–40%. By further drying the moisture content decreases to 10–15%, which is safe from a microbiologic viewpoint. Finally the dried extruded product is ground to a granule size distribution (50–200 μm) suitable for a substitute product for confectionery paste.

With respect to the substitute product on a basis of haricot beans the food composition according to the invention at least had a markedly improved granular structure in filled cakes, resembling very strongly that of almond paste.

EXAMPLE 2

100 parts by weight wheat flour, 10 parts by weight egg, 150 parts by weight soya beans, 40 parts by weight water and 5 parts by weight whey protein containing circa 50% lacto-albumin, are mixed and extruded in an HTST extruder under the conditions described in example 1. The extruded product with a moisture content of 10–15% is ground to a granule size distribution suitable for a confectionery paste.

EXAMPLE 3

50 parts by weight rye flour, 100 parts by weight haricot beans, 180 parts by weight soya beans, 20 parts by weight egg yolk and 80 parts by weight water are mixed and extruded in an HTST extruder, with an extrusion temperature of circa 130° C. The extrusion temperature (preferably lying between 50°–150° C.) is selected in relation to the time of stay in the extruder (for example 1 minute) such that a sufficient decapsulation, that is, making digestible, of the starch results. Finally the non-dried extruded product (moisture content circa 30%) or the dried extruded product (moisture content circa 10%) is ground to a granule size distribution suitable for a confectionery paste.

EXAMPLE 4

100 parts by weight wheat grits are steeped in 100 parts by weight fresh chicken egg white. The wheat grits are then dried with hot air at circa 100° C.

The granulate obtained is suitable for preparing fillings for bakery products and/or snacks, in combination with sugar, spices or other constituents normally used in the preparation.

EXAMPLE 5

100 parts by weight maize grits are absorbed into a whey protein dispersion consisting of 15 parts by weight whey protein (circa 70% lacto-albumin) and 50 parts by weight water. The maize grits are mixed with the whey protein dispersion, steam boiled and then dried. Dishes resembling couscous can be prepared from the granular food composition obtained.

EXAMPLE 6

From 100 parts by weight leguminous plants or cereal meal and 200 parts by weight fresh chicken egg white a homogenous dough is prepared. The dough is boiled and dried. The dried product is ground to a fine powder. From this powder a sweet filling can be prepared with sugar and water for the Japanese dish anko.

I claim:

1. A method for preparing a substantially granular food composition consisting essentially of digestible starch having a substantially granular structure and a coagulated coagulable protein, which food composition after its preparation may be incorporated into other food compositions, wherein one or more coagulable proteins obtained from a source selected from the group consisting of egg-white, egg yolk, whey proteins, serum albumin, and soya beans is applied to starch and said one or more proteins are subsequently coagulated at a temperature between about 50°–100° C., with the ratio of starch to protein being selected from between 97-60-:3–40.

2. Method as claimed in claim 1, wherein the ratio of starch to protein lies between 97-70:3–30.

3. Method as claimed in claim 1, wherein starch grits are provided with coagulable protein.

4. Method as claimed in claim 3, wherein the starch grits contain digestible starch.

5. Method as claimed in claim 3, wherein the starch grits contain indigestible starch and that said starch is converted into the digestible starch during coagulation of the protein.

6. Method as claimed in claim 1, wherein starch flour is mixed with the coagulable protein.

7. Method as claimed in claim 6, wherein the mixture of the coagulable protein and the starch flour is extruded.

8. Method as claimed in claim 6, wherein from the mixture of the coagulable protein and the starch flour threads are formed and that said threads are heated.

9. Product prepared according to the method of claim 1.

* * * * *

UNITED STATES PATENT AND TRADEMARK OFFICE
CERTIFICATE OF CORRECTION

PATENT NO. : 4,981,706

DATED : January 1, 1991

INVENTOR(S) : Jong C. Kim

It is certified that error appears in the above-identified patent and that said Letters Patent is hereby corrected as shown below:

ON THE TITLE PAGE:

Third line of Assignee information "onderzoak" should read --onderzoek--.

ON THE TITLE PAGE:
Under References Cited OTHER PUBLICATIONS insert --"Influence of Moist Heat on Solubility and Emulsification Properties of Soy and Peanut Flours," McWatters et al., Journal of Food Science, Volume 44, pages 774-776 (1979).--.

Column 1 Line 66 "coagulable" should read --coagulated--.

Signed and Sealed this

Second Day of February, 1993

*Attest:*

STEPHEN G. KUNIN

*Attesting Officer*  Acting Commissioner of Patents and Trademarks